United States Patent [19]

Happe

[11] 4,084,617
[45] Apr. 18, 1978

[54] PIPELINE CUTOFF DEVICE
[75] Inventor: Peter Happe, Eggenstein, Germany
[73] Assignee: Johann Baptist Rombach, Karlsruhe, GmbH & Co. KG, Germany
[21] Appl. No.: 686,689
[22] Filed: May 17, 1976
[30] Foreign Application Priority Data
May 17, 1975 Germany .............................. 2522084
[51] Int. Cl.² .............................................. F16K 13/00
[52] U.S. Cl. ........................... 137/625.28; 251/DIG. 2
[58] Field of Search ............. 251/DIG. 2; 137/625.28
[56] References Cited
U.S. PATENT DOCUMENTS

| | | | |
|---|---|---|---|
| 806,692 | 12/1905 | Meyersberg | 251/DIG. 2 |
| 1,138,994 | 5/1915 | Steele | 251/DIG. 2 |
| 2,180,173 | 11/1939 | Share | 251/DIG. 2 |
| 3,259,142 | 7/1966 | Richards | 251/DIG. 2 |
| 3,933,339 | 1/1976 | Dietzsch | 251/86 X |

FOREIGN PATENT DOCUMENTS

| | | | |
|---|---|---|---|
| 981,519 | 1/1951 | France | 251/DIG. 2 |
| 1,741,854 | 7/1956 | Germany | 251/DIG. 2 |
| 401,853 | 10/1973 | U.S.S.R. | 251/DIG. 2 |

Primary Examiner—Arnold Rosenthal
Attorney, Agent, or Firm—Craig & Antonelli

[57] ABSTRACT

A cutoff device for pipelines has a unilaterally clamped flexible closure strip which can be unrolled onto a valve seat wall which is provided with through-flow openings. A roll is provided upon which the flexible closure strip is rolled and from which the strip is unrolled, the winding roll being so disposed as to be displaceable back and forth along the surface of the valve seat wall. The winding roll is tensioned so as to insure proper displacement of the flexible closure strip onto and off the roll and off and over the through-flow openings.

8 Claims, 7 Drawing Figures

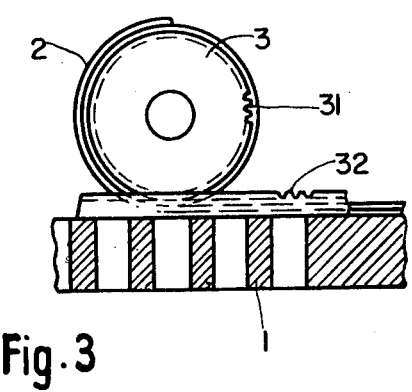
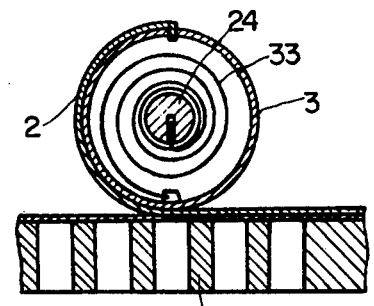
Fig. 3    Fig. 4
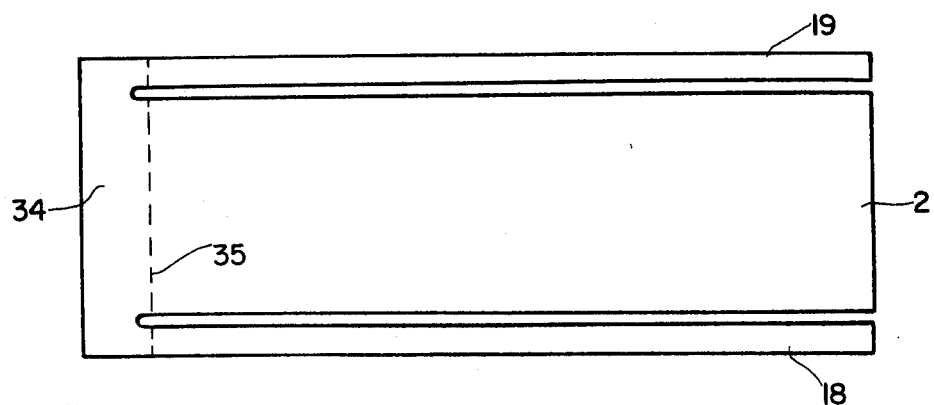
Fig. 5
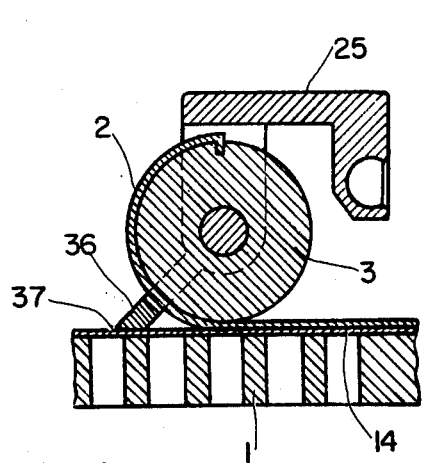
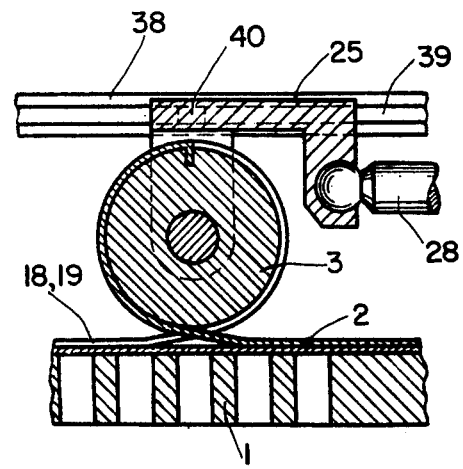
Fig. 6    Fig. 7

PIPELINE CUTOFF DEVICE

FIELD OF THE INVENTION

The present invention relates to a cutoff device for pipelines. This device has a unilaterally clamped flexible closure strip that can be rolled by means of a winding roll on a valve seat wall that is provided with flow-through openings.

The proposed cutoff device is used in conduits for liquid or gaseous media and is provided especially for cutting off, adjusting and regulating the throughput quantity of heating gas delivered to gas burners.

BACKGROUND OF THE INVENTION

Cutoff devices with a perforated valve seat wall located in a housing between intake and discharge, as well as a closure strip of elastic material that is applied against the valve seat wall by the through-flow pressure and that can be wound onto the wall are known in principle. Here, the closure strip is clamped on one front side, on the housing or the valve seat wall, while its other front side is disposed on a rotatably borne actuating shaft in the housing at a distance from the valve seat wall. Since the actuating shaft is disposed opposite the clamping point of the closure strip, the closure strip in its closed position forms a U-shaped loop whose height diminishes as the winding of the closure strip from the valve seat wall progresses, and thereby reduces the opening of the cutoff device. The winding or opening is effected by turning the actuating shaft, by means of an external hand wheel (see German Pat. No. 897,639).

Although cutoff devices with a flexible closure strip would be superior to the usual valves, cocks and slides, especially because of the slight amount of actuating force that is required and their practically unlimited opening characteristics, they could not be used heretofore in practice because the long loop of the closure strip fluttered, from the influence of the medium flowing past it, and this resulted first in tears on the long edge of the strip, which eventually could lead to destruction of the strip.

For this reason, the problem is to produce a cutoff device of the type that has been described, such that the damage to the strip will be avoided.

SUMMARY OF THE INVENTION

The problem is solved in that the winding roll for winding the closure strip over the valve seat wall is disposed so that it moves reciprocatingly. In this way, the closure strip is wound onto or off the valve seat wall directly, without formation of a loop. This process of winding on or off of the closing strip by reciprocatingly moving the rotatable winding roll corresponds to the process of laying a carpet.

A pretensioned torsion spring can engage the winding roll. The torsion spring exerts a tension on the closure strip in the winding and unwinding, which guarantees that even very thin strips that are not rigid in the longitudinal direction will always lie flat over the valve seat wall. The same objective is achieved if the closure strip itself is made as a torsion spring and is applied onto the winding roll as an intrinsically pretensioned coil.

The winding roll may present a gear rim that engages a rack guided along the valve seat wall. Thereby in the reciprocating motion there is forced rotation of the winding roll that effects the winding or unwinding of the closure strip. This forced rotation results in acceptable functioning of the proposed cutoff device.

In an embodiment of the cutoff device that is of the present invention, the forced rotation of the winding roll is produced by at least one unilaterally clamped flexible guide strip that is wound or unwound on the winding roll counter to the closure strip. Use of such a guide strip makes the functioning of the proposed cutoff device independent of the position of its incorporation.

Advantageously two guide strips are provided, that are integral with the closure strip. Use of two, disposed on either side of the closure strip on the winding roll and deriving from the same cut material, by virtue of the symmetrical disposition affords good guiding of the winding roll and also eliminates adjustment operations.

Advantageously the winding roll is rotatably borne in a fork that present a ball cup; this allows free movability of the winding roll under the influence of the closure strip or the guide strips.

For reciprocating movement of the winding roll, there is provision of a longitudinally displaceable actuating rod with a ball head that engages in the cup of the fork.

To effect absolute closure in the closed position of the cutoff device, a packing is provided in a known way on the valve seat wall.

In a preferred embodiment of the cutoff device, an annular part of the housing is provided over the valve seat wall, which annular part presents fixing means for the closure strip and the guide strips, and the packing is seated in a recess in the valve seat wall. By means of these structural arrangements, it is possible to remove the valve seat wall alone without disassembling the whole cutoff device, and to exchange it for example for another that presents differently arranged through-flow openings.

Advantageously a scraper is fixed on the fork, sliding over the packing. This scraper serves to remove particles that may be deposited on the packing when the cutoff device is open, which particles might obstruct an acceptable seal by the closure strip.

Advantageously the winding roll is composed of two half cylinders. This considerably facilitates the fastening of the closure strip and the guide strips on the roll.

For holding the winding roll, there may be provision of a support rail lying in the unwinding direction of the closure strip. Guiding of the winding roll in a support rail allows reciprocating movement of the winding roll at a distance above the seat wall.

BRIEF DESCRIPTION OF THE DRAWINGS

FIG. 3 shows a lateral view of winding roll that is force-rotated by means of gear rim and rack.

FIG. 4 shows a winding roll with a torsion spring, in cross section.

FIG. 5 shows a top view of two guide strips that are integral with a closure strip.

FIG. 6 shows a winding roll in connection with a scraper that is fixed on the fork, in cross section.

FIG. 7 shows a winding roll that is guided by guide rails at a distance above the valve seat wall, force-rotated by guide strips, in cross section.

DETAILED DESCRIPTION

Figure 1:
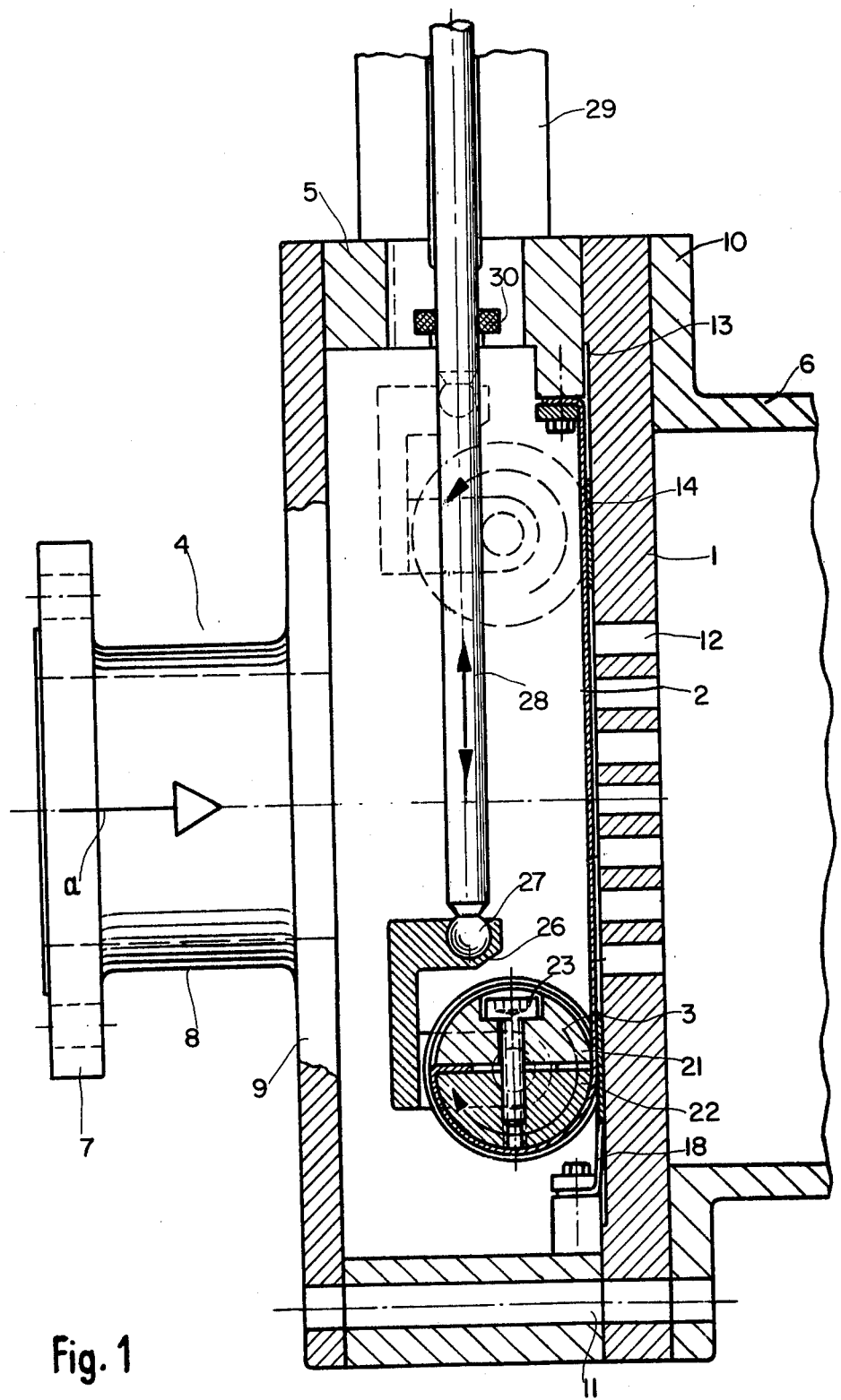
FIG. 1 shows a cutoff device in a preferred embodiment, in axial section.
Figure 2:
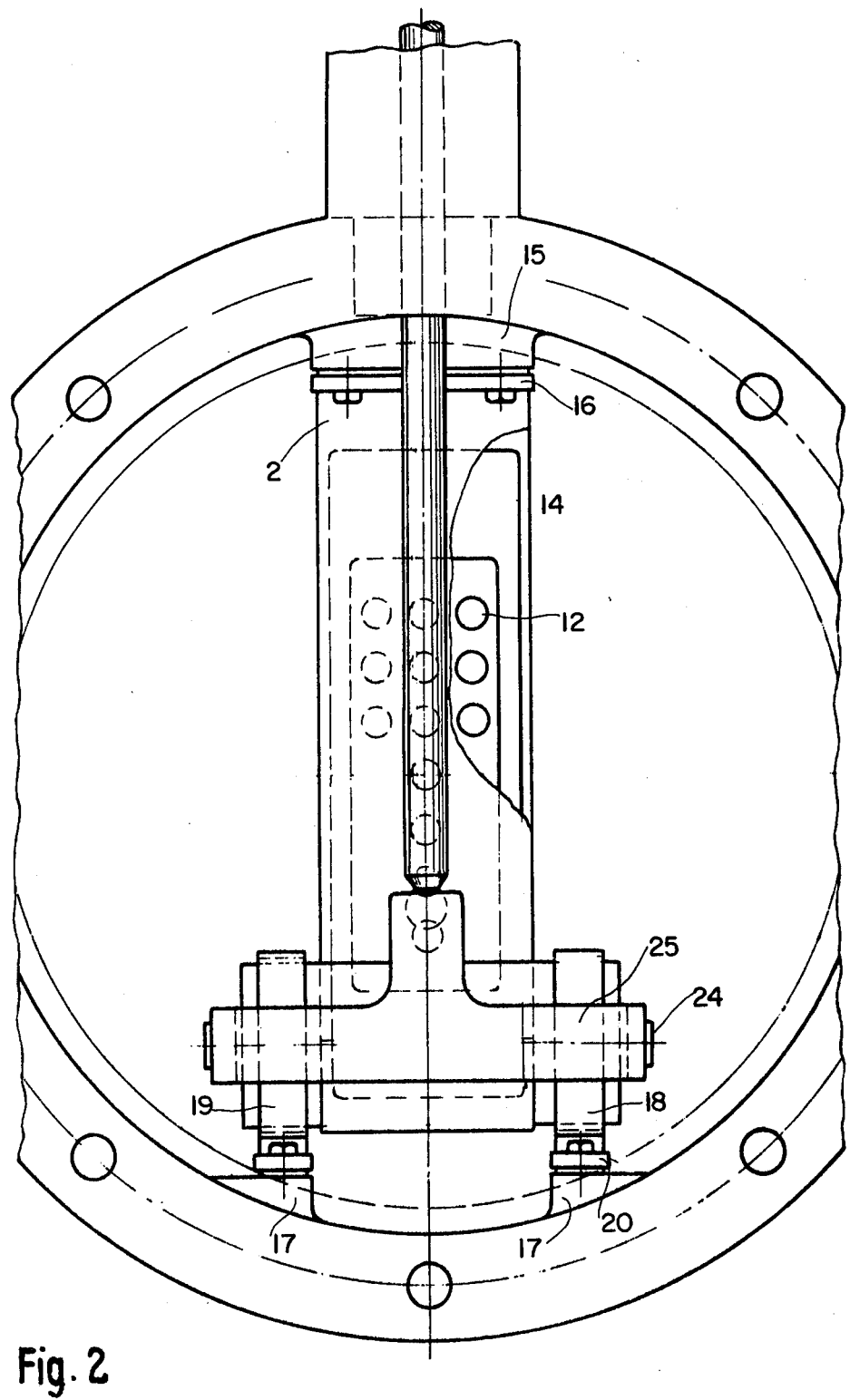
FIG. 2 shows a top view of the cutoff device of FIG. 1 with the intake part removed.

The cutoff device shown in FIGS. 1 and 2 has three essential parts: a valve seat wall 1, a closure strip 2 and a winding roll 3.

Valve seat wall 1 is in a tripartite housing that comprises an intake part 4, a housing annular part 5, and a discharge part 6.

Intake part 4 consists of a connecting flange 7, a short section of pipe 8, and a covering flange 9 that is applied on annular part 5 of the housing. Valve seat wall 1 is connected to annular part 5, and the connection of the housing forms discharge part 6 that has a flange 10, the said element being shown as broken off. Intake part 4, annular part 5, valve seat wall 1 and discharge part 6 are provided with an annular piece with aligned holes 11 which serve to accept threaded bolts (not shown) wherewith the housing is held together and bolted.

Valve seat wall 1 that is made as a circular flat plate has a plurality of flow-through ports 12 that are disposed in three different long rows next to each other (see FIG. 2). In a lower circular-cylindrical recess 13 there is a gasket 14 that is rectangular in outline, made of rubber elastic material, with a rectangular recess that leaves flow-through ports 12 free.

On the inner wall of annular part 5 of the housing there projects a wide bridge 15 on which closure strip 2 is unilaterally clamped by means of a pressure plate 16, with use of hex head screws. On the opposite side of the inner wall of annular part 5 of the housing there are two narrow tips 17 on which two guide strips 18 and 19 are fixed, with use of plates 20 and hex head screws.

The cylindrical winding roll 3 is made in two parts and consists of two half cylinders 21 and 22 that are held together by head screws 23. The ends of closure strip 2 as well as those of both guide strips 18 and 19 are clamped between the two said half cylinders 21 and 22.

Winding roll 3 has on its head surfaces, two journals 24 with which it is rotatably borne with lateral clearance in a fork 25. Fork 25 has a ball cup 26 that engages a ball head 27 that forms the end of a longitudinally displaceable actuating rod 28. Actuating rod 28 is guided in a guide cylinder 29 screwed in from the outside in annular part 5 of the housing provided with a sealing ring 30. Pneumatic or electromotor actuating devices (not illustrated) engage guide cylinder 29, by which means actuating rod 28 is displaceable.

Actuating rod 28 serves to move winding roll 3 reciprocatingly over the valve seat wall 1, whereby closure strip 2 rolling over valve seat wall 1 is wound or unwound by winding roll 3. Since the two guide strips 18 and 19 are rolled opposedly to closure strip 2 on winding roll 3, when they are moved back and forth, there is a forced rotation of winding roll 3.

Another way to effect the forced rotation of winding roll 3 during its receiprocating motion over valve seat wall 1 is illustrated in FIG. 3. Here winding roll 3 is provided with gear rim teeth 31 in engagement with a rack 32 fixed on valve seat wall 1.

Closure strip 2 (FIG. 1) is pressed by the flow-through medium flowing in through intake part 4 into the cutoff device in the direction of arrow "a" against valve seat wall 1. With suitable design of closure strip 2, this element is of itself applied flatly and sealingly on valve seat wall 1 in the reciprocating motion of winding roll 3, under the influence of the through-flow medium. With use of closure strips 2 that are sufficiently rigid longitudinally, instead of the forced rotation shown in FIGS. 1 and 2 or 3 (by means of the oppositely wound guide strips 18 and 19 or by means of gear rim 31 and rack 32), there may also be the incorporation of a pretensioned torsion spring 33 (FIG. 4) in winding roll 3, by means of which a permanent tension will be exerted on closure strip 2. The same effect is obtained if closure strip 2 consists of spring steel and is wound to form a torsion strip.

FIG. 5 shows in outline a rectangular cut for a closure strip 2 and two guide strips 18 and 19 where strip 2 and the two guide strips 18 and 19 are joined at one side 34. Side 34 is fixed, up to dashed line 35, in a bipartite winding roll 3, and closure strip 2 and guide strips 18 and 19 are then bent at right angles in opposite directions on said dashed line 35, but instead of this cut there may just as well be one that presents two closure strips 2 and a guide strip disposed between them.

FIG. 6 shows a fork 25 for a winding roll 3, on which a scraper 36 is fixed that wipes over the packing with a blade 37 ahead of closure strip 2 rolling from winding roll 3.

FIG. 7 shows a winding roll 3 arranged to move reciprocatingly at a distance above valve seat wall 1, said roll being force-rotated with use of guide strips 18 and 19. In the rolling off direction of strip 2 or the direction of displacement of actuating organ 28, supporting rails 38 are provided on either side of fork 25, the rails presenting a longitudinal groove 39 in which studs 40 that project laterally on fork 25 engage. Support rails 38 may, however, be so disposed that journal 24 will engage groove 39.

I claim:

1. In a cutoff device for pipelines having a housing, a flexible closure strip which can be unrolled onto a valve seat wall having through-flow openings, part of said strip being secured to said housing, a winding roll for rolling and unrolling said strip, said roll being connected to said strip, and means for reciprocating said winding roll across said openings, the improvement comp rising means in addition to said reciprocating means for applying a rotational torque to said winding roll so as to cause said strip to be wound upon said roll as said roll is reciprocated across said parts, and characterized in that an annular part of the housing is provided over the valve seat wall, which annular part has fastening means for the closure strip and guide strips are provided which roll on and off the roll in opposition to the closure strip and in that a gasket is seated in a recess of the valve seat wall.

2. A cutoff device according to claim 1, characterized in that two guide strips are provided which are integral with the closure strip.

3. A cutoff device according to claim 1, characterized in that a supporting rail is provided in the roll-off direction of closure strip for holding winding roll.

4. A cutoff device according to claim 1, wherein the winding roll is formed of two half cylinders, and wherein said closure strip and said guide strips have an end thereof secured between said half cylinders.

5. In a cutoff device for pipelines having a housing, a flexible closure strip which can be unrolled onto a valve seat wall having through-flow openings, part of said strip being secured to said housing, a winding roll for rolling and unrolling said strip, said roll being connected to said strip, and means for reciprocating said winding roll across said openings, the improvement comprising means in addition to said reciprocating means for applying a rotational torque to said winding roll so as to cause said strip to be wound upon said roll as said roll is reciprocated across said parts, and characterized in that the winding roll is composed of two half cylinders.

6. A cutoff device according to claim 5, characterized in that the winding roll is rotatably borne in a fork having a ball cup.

7. A cutoff device according to claim 6, characterized in that, for the reciprocating guidance of the winding roll there is provided a longitudinally displaceable actuating rod engaging with a ball head in the ball cup of the fork.

8. A cutoff device according to claim 5, wherein the winding roll is engaged for forced rotation to effect the winding or unwinding of the closure strip.

* * * * *